Fig.1

June 4, 1935.　　I. A. WEAVER ET AL　　2,003,912

WHEEL TESTING APPARATUS

Filed Sept. 12, 1929　　6 Sheets-Sheet 5

Patented June 4, 1935

2,003,912

UNITED STATES PATENT OFFICE 2,003,912

WHEEL TESTING APPARATUS

Ira A. Weaver, Albert R. Squyer, and Earl K. Hall, Springfield, Ill., assignors to Weaver Manufacturing Company, Springfield, Ill., a corporation of Illinois Application September 12, 1929, Serial No. 392,102

18 Claims. (Cl. 73—51)

The present invention relates to appliances which will accurately and reliably test vehicle-wheels to ascertain the condition and functioning capacities of the several brakes operative thereon and to determine whether or not the wheels require correction as to the existence, extent, or degree of their in or out toe.

One leading aim or purpose of the invention is the provision of an apparatus of this character which will automatically test the brakes of all four wheels of an automobile and give a visual indication of their individual states, as well as detect and show the presence and amount of any malalignment of the front or rear wheels, all of which may be readily and easily accomplished by merely driving the car over the appliance, the indicating means being within the range of vision of the driver of the automobile.

A further object of the invention is to provide a machine of this type which will do the specified work in a trustworthy manner, which is relatively simple in structure, which may be manufactured at comparatively small cost, and which is unlikely to become injured or damaged when subjected to ordinary service conditions.

To enable those acquainted with this art to fully understand the invention and to appreciate the structural and functional advantages arising from the employment thereof, in the accompanying drawings, forming a part of this specification, and to which reference should be made in connection with the following detailed description, preferred embodiments of the invention have been shown, and, for simplicity, like reference numerals have been employed throughout the several views to designate the same structural elements.

Figure 5:
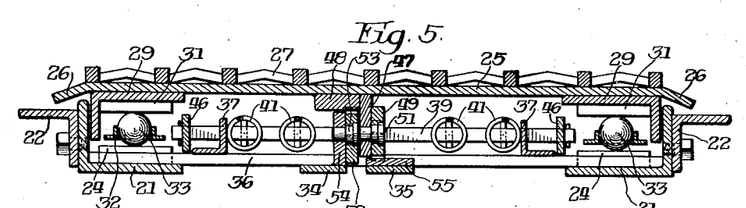
Figure 5 is a vertical cross-section on line 5—5 of Figure 3.

By reference to these drawings, it will be apparent, that two, parallel frames, connected together at about their middle portions, are, together with such transverse connection, set in recesses in the floor as shown in Figure 5, each such longitudinal frame being composed of a pair of oppositely-facing angle-bars 21, 21, to the upstanding flanges of which are fastened other angle-bars 22, 22, the end portions of the united lengthwise bars being cross connected together by corresponding short angle-bars 23, the inwardly-disposed, horizontal flanges of the angle-bars 21, 21, having welded thereto at intervals flat, bearing blocks 24, 24.

Figure 1:
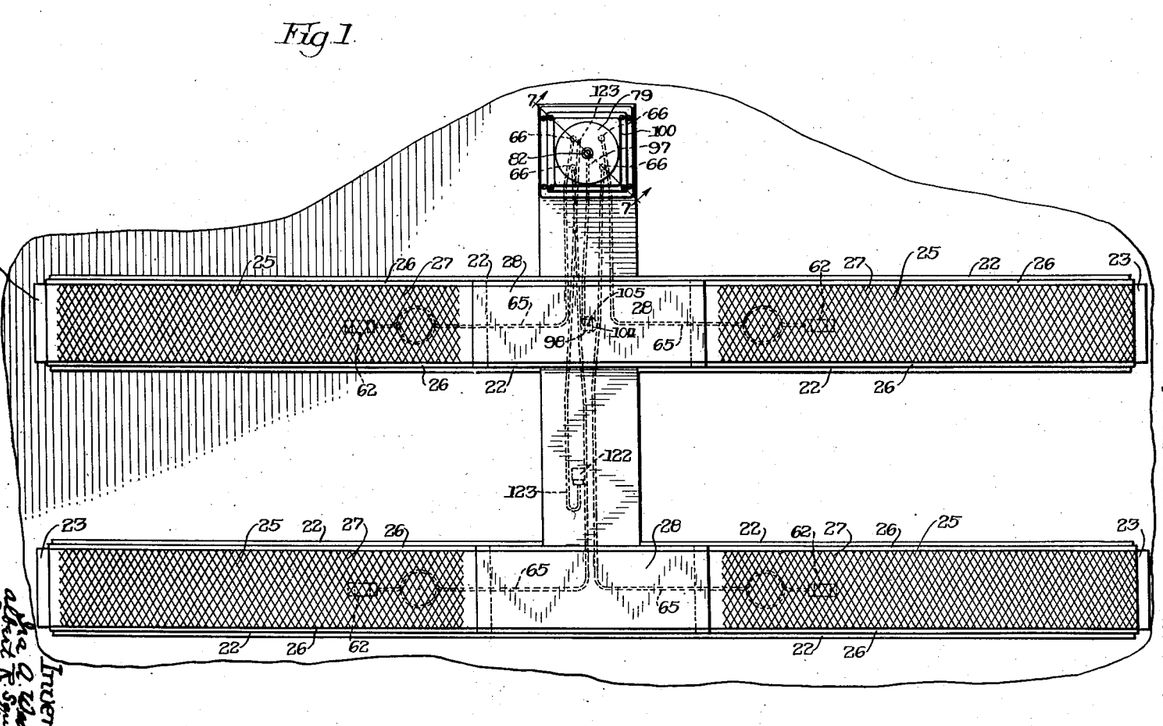
Figure 1 is a plan view of the improved and novel appliance.

The appliance also includes four, movable, top or cover plates 25 (Figure 1) with downwardly-sloping, side, marginal, flanges, 26, 26, (Figure 5) overlying the angle-bars 22, the upper faces of the top plates 25 being roughened at 27 in any approved manner, as by the welding of sheets of expanded metal to their surfaces, to prevent the vehicle-wheel tires from skidding or sliding thereon.

Between the adjacent ends of the two pairs of plates 25, 25, two, flat, intermediate cover-plates 28, 28 are employed, in a sense representing continuations of the plates 25.

Figure 4:
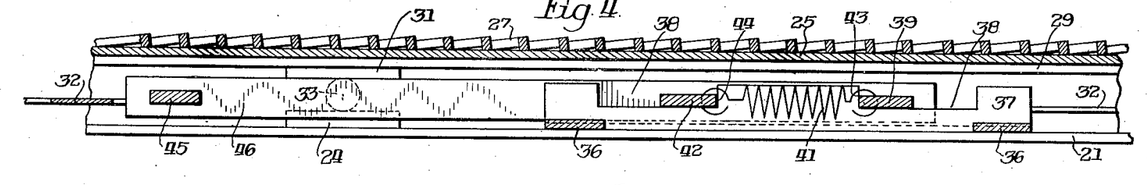
Figure 4 is a similar section on line 4—4 of Figure 2.

Secured lengthwise, as by welding, to the under-surface of each plate 25, there is a pair of parallel angle-bars 29, 29, each equipped at intervals with flat, bearing-plates 31, 31, located above the plates 24, 24, as shown, perhaps, most clearly in Figures 4 and 5.

For each such top plate 25, a rectangular, ball-bearing, skeleton frame or cage 32 (Figures 2 and 5) is employed which accommodates any proper or appropriate number of anti-friction balls 33, 33 riding on the underlying plates 24, 24 and on which the upper plates 31, 31 bear, so that each plate 25 is free to move lengthwise with but little friction to resist such travel.

In order to positively move the anti-friction ball-cage and its balls with the travel of the corresponding cover or traction plate 25, the center of a lever 125 is pivoted at 126 to an oblique cross-bar of the cage, one end of the lever having a pin-and-slot fulcrum connection 127 with the base and a similar connection 128 with the plate 25.

This arrangement mechanically and positively propels the cage and its associated balls the required one-half of the distance traveled by the traction-plate, thus assuring a satisfactory and efficient operation of the anti-friction means.

The plates 25 may shift longitudinally of the appliance in either direction, depending upon the line of motion of the vehicle passing over them with its wheels in contact therewith, and, to resist such movement of the plates, the following, cooperating mechanical instrumentalities have been employed.

Under each plate 25 there are a pair of flat, longitudinal plates 34, 35 secured to the corresponding angle-bars 21 by cross-bars 36, 36, which, in turn, have welded to them and which support a pair of parallel, lengthwise-disposed angle-bars 37, 37, the upright flange of each of which is cut away to provide two, spaced recesses 38, 38 (Figure 4).

One pair of such cavities 38, 38 of the companion bars 37, 37 accommodate a cross-bar 39 (Figures 2, 3, 4, and 5) to which is fastened one end of a plurality of coiled, expansible and contractile springs 41, 41, the other ends of such springs being similarly connected to a second cross-bar 42 occupying the remaining pair of recesses 38, 38 of the pair of bars, the normal contraction of the springs 41, 41 holding the two bars 39 and 42 against the shoulders 43 and 44 of the recessed flanges of the two bars 37, 37, all as is clearly shown in Figure 4.

Cross-bar 39 and another similar cross-bar 45 have their opposite ends connected together by a pair of longitudinal bars 46, 46, (Figures 2, 3, 4, and 5) the four parts thus constituting a movable rectangular frame.

Each traction-plate 25 has a depending, longitudinal web or fin 47 welded to its under surface and also welded to the same surface of the plate and against the rib 47, is a block 48.

Figure 3:
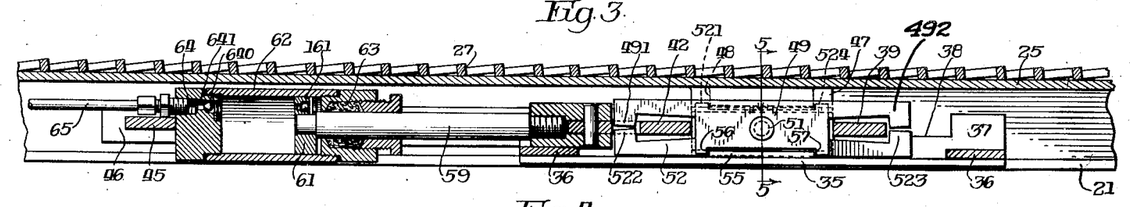
Figure 3 is an enlarged, vertical, longitudinal section on line 3—3 of Figure 2, but with the traction-plate in position.

A cam 49, of the shape shown in Figure 3, is rockingly mounted on the fin 47 on a fulcrum pin 51, and, in similar manner, a reversely-arranged like cam 52 is rockingly pinned at 53 on a horizontal bar 54 welded to the member 34.

Plate 35 has fastened to its upper surface a block 55 cooperating with opposed shoulders or lugs 56 and 57 of cam 49, and, in similar manner, block 47 coacts with like lugs or projections 521, 524 of cam 52.

Each bar 42, by means of an appropriate connection 58, has secured to it a rod 59 carrying a valved plunger or piston 61 slidable in a cylinder 62 mounted on the associated cross-bar 45, the plunger-rod extending through a suitable stuffing-box 63.

Piston 61 has a metered passage extended through it controlled by a ball check-valve 161 which opens when the piston travels to the left and which closes when the piston moves in the opposite direction.

Cylinder 62, and the connections hereinafter described, are filled with a colored liquid of suitable, substantially-constant viscosity so that it is practically uninfluenced by weather or temperature conditions.

From what precedes, it will be clear that, if the bar 42, as shown in Figure 3, moves to the left while the bars 39 and 45 and the associated cylinder remain stationary, the movement of the plunger or piston in the cylinder will expel a portion of such liquid contents, and, on the other hand, if the bar 42 remains stationary and the frame, including the parts 39, 45 and cylinder 62 travel to the right, the plunger then staying fixed, a similar expulsion of the liquid, or a portion of it, will occur.

A valved port 64 through the cylinder-head of greater capacity than the passage through the piston and supplied with an unvalved metered by-pass 641, is connected by a coiled pipe 65 to the lower end of a corresponding, upright, glass, gauge-tube 66 between two downwardly-closing, upwardly-opening ball check-valves 67 and 68 (Figure 7), the incoming liquid automatically opening the upper valve 68 and entering the tube 66, causing a rise of the smaller amount of liquid already therein, so that the level of the liquid will correspond to the extent of travel of the piston in the cylinder, or of the cylinder relative to the piston, depending upon the direction of travel of the vehicle-wheel over the traction cover-plate and during the application of the brake to the wheel.

As soon as the maximum quantity of liquid has been forced into the tube 66, valve 68 closes its port automatically by gravity, thus retaining the liquid above it in the gauge-tube where it is readily visible to the occupant of the driver's seat of the automobile undergoing the test.

Figures 9, 10, 11, 13:
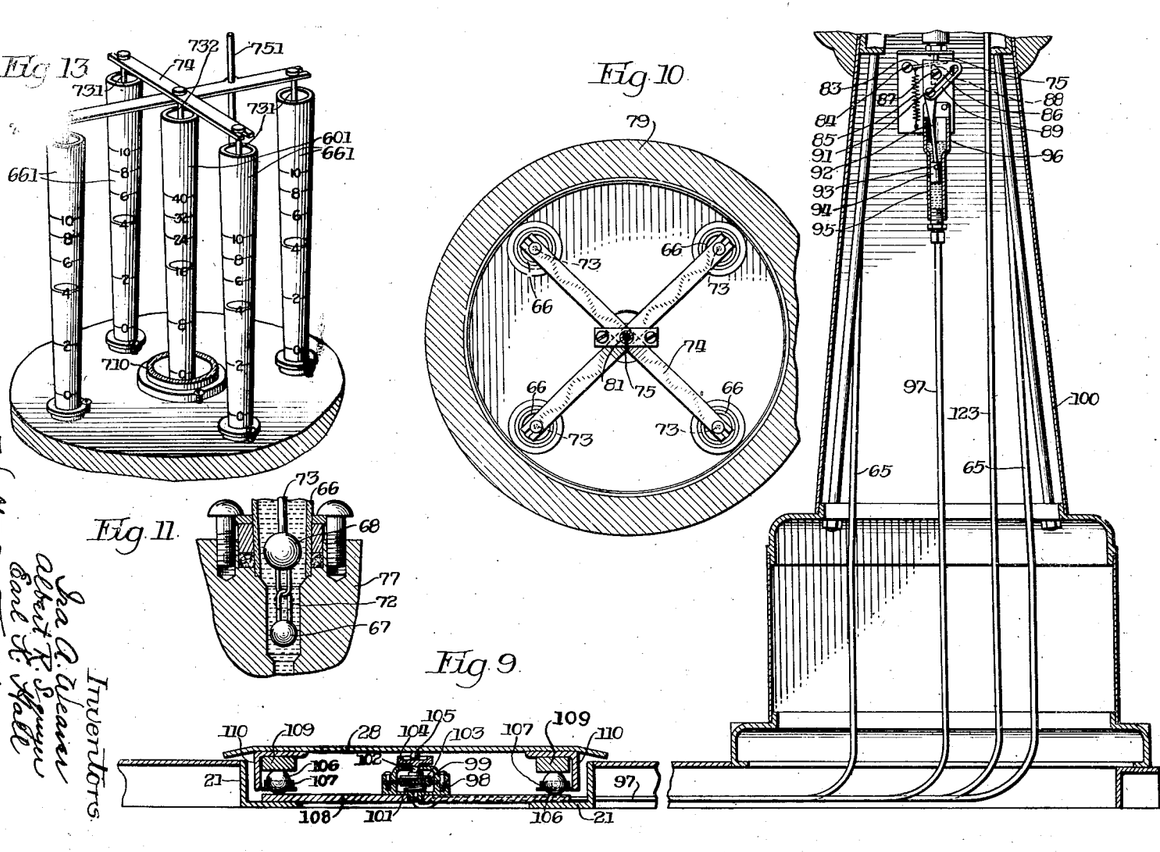
Figure 9 is an enlarged, vertical section on line 9—9 of Figure 2.
Figure 10 is a horizontal section on line 10—10 of Figure 7.
Figure 11 is a detailed view of two of the valves and their operating means.
Figure 13 is a fragmentary, perspective view of a modified form of construction.
Figure 12:
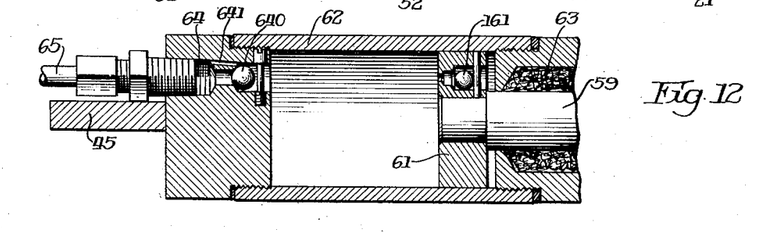
Figure 12 is a portion of Figure 3 enlarged.

Each ball-valve 68 and its companion valve 67, which controls a port associated with a conduit 69 connecting the lower end of a central glass reservoir 71, common to and similarly associated with all of the four glass gauge-tubes 66, are connected together by a small chain 72 which permits a relative movement between the two valves (Figure 11).

The four tubes 66, 66 are arranged in the same relation to one another as are the traction-plates with which they are affiliated, so that the driver of the car can readily perceive the condition of all the brakes, and can easily compare their performances.

Each valve 68 is mounted on the lower end of a rod 73 extending up out of the open top end of the vertical glass-tube 66 where it is slidingly connected to one arm of a spider 74, the other outstanding arms of which are associated with corresponding rods 73 of the other gauge-tubes and valves.

Each rod at its top end has an enlargement or head, so that the valves may open upwardly independently of one another and, by raising the spider, all of the valves 68 and 67 may be simultaneously opened.

After the liquid has been forced into their respective tubes, by the four traction-plates 25 and the columns of liquid retained therein by the closure of their ball-valves 68, it is, of course, necessary to open such valves in order to let the liquid drain out ready for the next actuation of the appliance, and for this purpose the following mechanism is provided.

Spider 74 is mounted on an upright rod 75 slidable in a tubular bearing 76 mounted at its lower end in a base 77 of a glass-casing 78 enclosing all of the gauge-tubes 66 and fitted with a cover 79 having a central bearing tube 81 extended therethrough and through which the rod 75 projects and is slidable, the protruding or upper end of the rod being equipped with a manually-actuated knob 82.

The lower end of rod 75 (see Figure 9) is above a rocker-arm 83 fulcrumed on a suitable support at 84 and normally pulled downwardly by a coiled, contractible spring 85, the position of such arm being controlled by a slotted rocker 86 fulcrumed at 87 and carrying on its inner surface a cam or projection 88 which, in the position shown in Figure 9, holds the rods 75 elevated and all of the valves 68 and 67 open, but when the rocker 86 is turned on its fulcrum, the cam 88 rocks sufficiently to let the arm 83 and rod 75 descend to permit closure of all of the valves 68 and 67.

Rocker 86 is slotted at 89, such slot accommodating a pin 91 on the end of a connecting-rod 92 fulcrumed at 93 on a plunger 94 reciprocatory vertically in an upright cylinder 95 having an enlarged, open, top end portion 96 accommodating a surplus of liquid so as to assure that the cylinder 95 will at all times be properly supplied with such element.

The lower end of the interior of cylinder 95 is connected by a tube or pipe 97 to the inside of the lower portion of a pump-casing 98 divided horizontally into two compartments by a flexible diaphragm 99 between which and the lower wall of the casing there is an interposed, expansion, coiled spring 101.

The upper wall of the casing 98 is apertured for the accommodation, slidingly, of a plunger 102, whose lower, enlarged end 103 bears on the top of the flexible diaphragm and whose upper, exterior, enlarged head 104 has a surface cavity accommodating an anti-friction ball 105 on which bears that one of the two cover-plates 28 nearest the hollow column or standard 100 supporting the casing 78.

Such particular plate 28 and its companion plate 28 at the other side of the appliance are each carried on anti-friction balls 106, 106 within a suitable cage 107 and cooperating with tracks 108 on the base and 109 on the under side of the plate (Figures 2 and 9), the margins of the plate being more or less stiffened by angle-bars 110 welded thereto, but the center of the one plate above the ball 105 may flex sufficiently, when a vehicle-wheel rolls over it, to deflect the diaphragm and force enough of the liquid below it through the tube 97 to elevate the plunger 94 and to turn the rocker 86 to raise or to lower the rod 75 and all of its sets of valves 68 and 67.

When the front wheel of the vehicle rolls over this plate 28 and without the application of its brake, the rod 75, by the action of plunger 94 and rocker 86, is permitted to descend and allow the closure of all of the valves 68 and 67, and when the rear wheel similarly traverses the plate all of the valves are opened by the ascent of rod 75.

Figure 2:
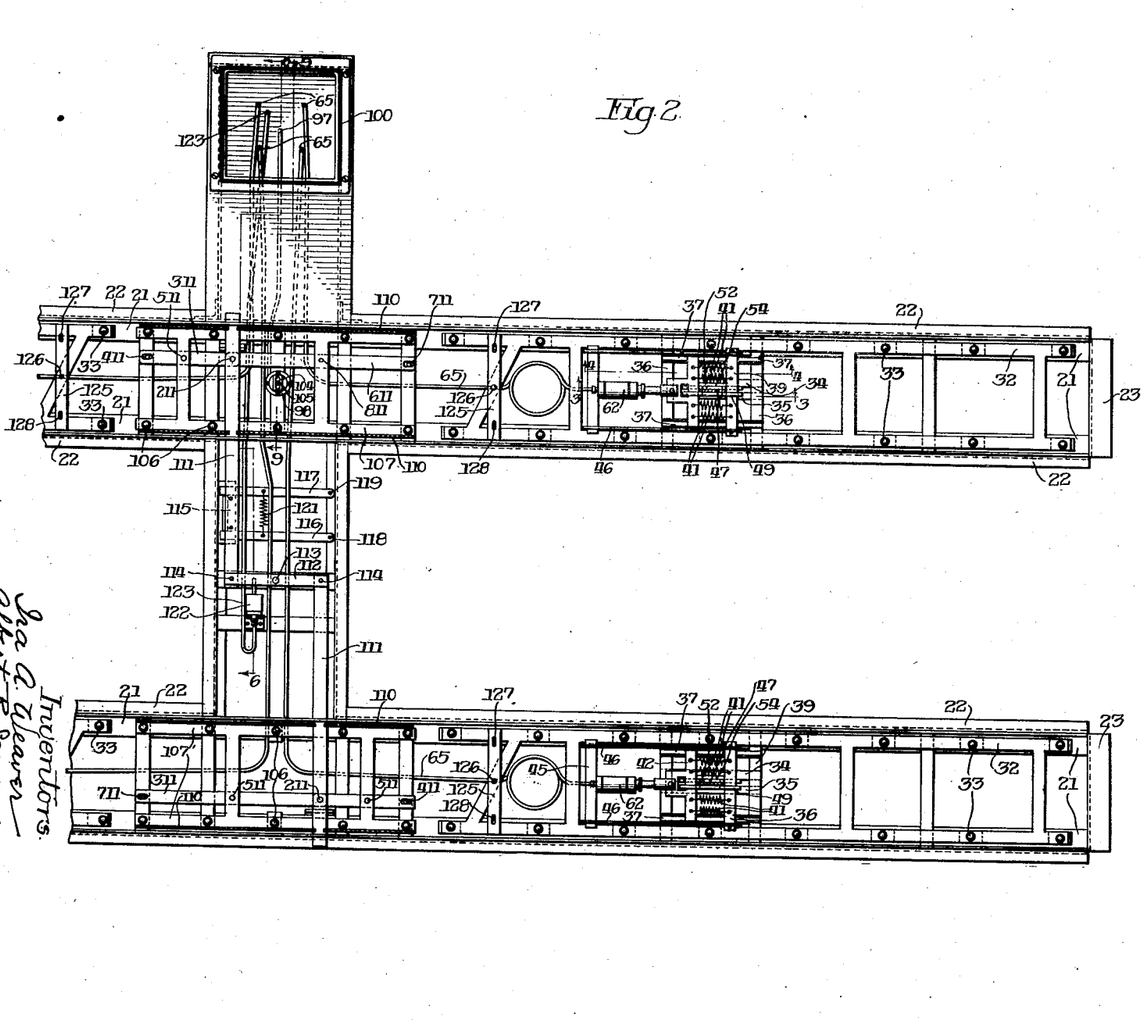
Figure 2 is a fragmentary, horizontal section through the angle-bar flanges of the intermediate, alignment plates and with the four traction-plates removed.
Figures 6, 7, 8:
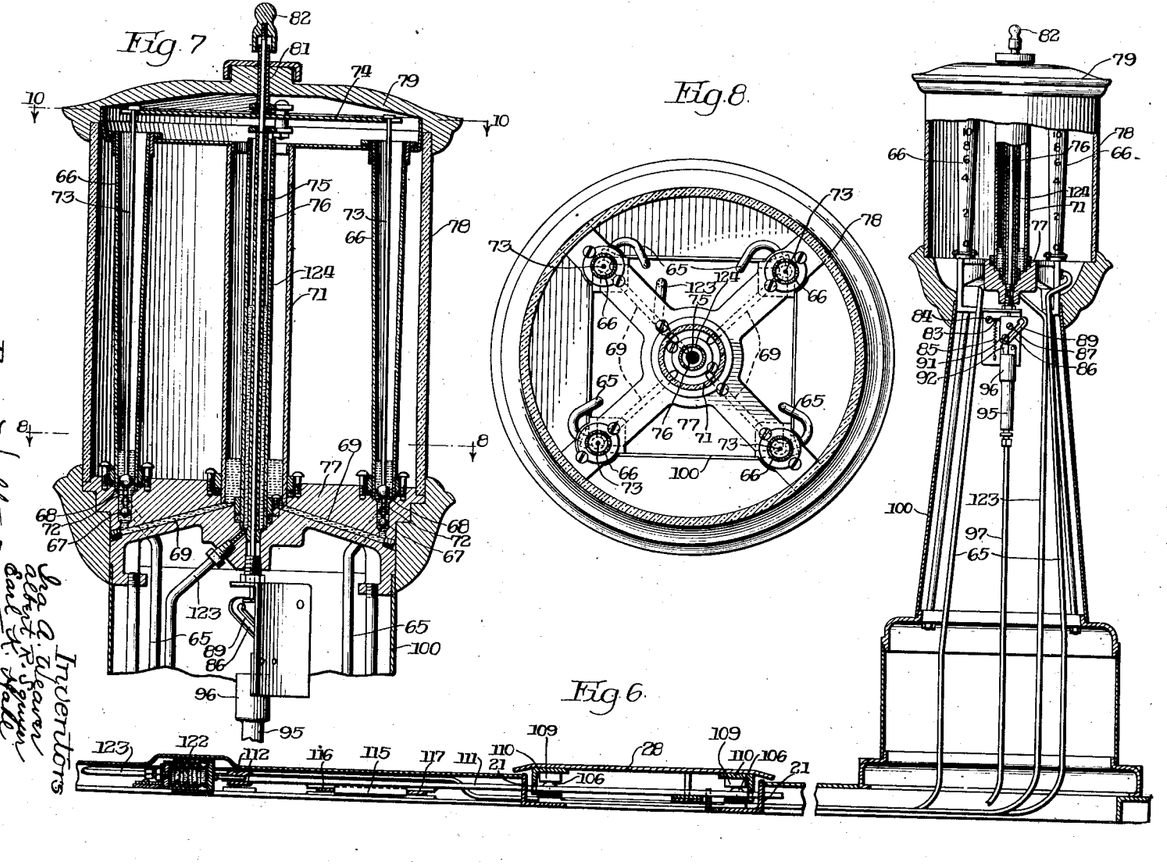
Figure 6 is a vertical section on an enlarged scale on line 6—6 of Figure 2.
Figure 7 is an enlarged, vertical section on line 7—7 of Figure 1.
Figure 8 is a horizontal section through the top portion of the display casing on line 8—8 of Figure 7.

As is indicated in Figures 2 and 6, the two angle-bars 21, 21 at each side of the apparatus are slotted in register for the sliding accommodation of two bars 111, 111, the slots being of the same length as the width of the bars, so that the latter are free to move longitudinally therein but not transversely of the length of the bars.

Just inside of the angle-bars 21, 21, each bar 111 is recessed in register in its opposite edges into which cavities fit portions of the interrupted flanges of the angle-bars 110, 110, whereby, when either plate 28 shifts sidewise, it carries the corresponding bar 111, with it in the direction of the lengthwise dimension of the latter, but the bars 111 prevent the plates 28 from traveling lengthwise, limiting their movements to sidewise motions.

In other words, each plate is in a measure locked to its correlated bar 111.

In order to compel each anti-friction ball skeleton-cage 107 to move sidewise with the corresponding travel of its plate 28, but one-half the amount of movement of the latter, to assure efficient anti-friction action, each bar 111 has rockingly connected to it at 211 one end of a shorter lever 311 having at its opposite end a pin-and-slot fulcrum connection 411 with the base, and, at the middle of its length, a rocking connection 511 with the ball-cage, and the end of a longer lever 611, having at its other end a like pin-and-slot fulcrum connection 711 with the base and at its center a rocking connection 811 with a cross-bar of the ball-cage.

An equalizing-lever 112 is rockingly mounted at its center on a fulcrum-pin 113 on the base and the adjacent ends of the two bars 111, 111 are hinged to the lever 112 at 114, 114 at equal distances from the fulcrum-pin 113, whereby the two elements 111, 111 and their associated plates 28, 28 must move equally and simultaneously.

In order that such connected or associated mechanical elements may be automatically centered, with capacity for shifting in either of opposite directions therefrom, one of the bars 111 has a block 115 fixed against its under surface, and two rock-arms 116, 117, fulcrumed at 118 and 119, respectively, on the base, are pulled toward one another by a coiled, contractile spring 121 connected to both, these rock-arms overlapping the opposite ends of block 115, as shown in Figure 2.

As depicted in Figures 2 and 6, the equalizer-lever 112 is joined in any approved manner, to an end wall of a liquid-filled, expansible and contractible, accordian-like "sylphon" 122 connected by a tube 123 to the lower end of an upright, glass tube 124 inside of the glass reservoir-tube 71 and through which said tube 124 the rod 75 and its bearing-sleeve 76 extends, all as is clearly shown in Figure 7.

The zero graduation of such wheel-alignment tube 124 is desirably at about the middle of its height and such system is filled with just enough suitably-colored liquid so that, when the pair of alignment-plates 28, 28 are in their normal, central positions, its surface level will register with such zero mark.

If the plates 28, 28 are shifted to one side such liquid level will rise above the mark a corresponding amount, and, if the plates are moved in the opposite direction sidewise, the liquid level will sink accordingly below the mark.

The appliance operates substantially as follows, assuming that an automobile, equipped with brakes for all four wheels, travels over it from right to left as the apparatus is shown in the various figures.

As the front wheels of the vehicle, with their brakes inoperative, roll lengthwise over the first set of plates 25, 25, nothing happens, but when such unbraked, front wheels in their continued travel roll on the pair of interconnected, intermediate, alignment-testing plates, 28, 28 two, substantially-different results are brought about.

Firstly, if the two front wheels are exactly true to the line of travel and parallel, no sidewise shifting of either of such plates will take place, but, if the wheels toe in or toe out, the two plates will be automatically moved either toward one another or away from one another a distance corresponding respectively to the degree or extent of in toe or out toe.

Such movements of the plates, through the action of the equalizer-lever and sylphon, will cause the colored liquid, whose surface previously registered with the zero graduation on the alignment-tube 124, to rise or to descend from such mark an amount agreeing with the extent of toe in or toe out.

Such indication of the condition of the wheels is easily observed by the driver of the car from his seat as the automobile rolls along, and he can thus readily ascertain whether or not, because of maladjustment, the front wheels of the automobile require attention or correction.

Secondly, the weight of the right-hand front wheel at the same time depresses the central portion of its plate 28 sufficiently to cause the diaphragm-pump 98, 99 to force liquid into cylinder 95 and to produce the ascent of its plunger, the latter working through the associated rocker, cam, etc., and rod 75 to lower all of the eight ball-valves 67 and 68, elevated during the preceding test of another automobile, into their port-closing positions.

As the automobile continues its travel, its front wheels pass on to the remaining two of the traction-plates 25, 25 at about the same time that its rear wheels roll on to the other pair of plates 25, 25, and, when such front wheels leave the intermediate plates 28, 28, the latter, if they have been previously shifted sidewise by the toe in or toe out of the wheels, return automatically, under the action of spring 121 and arm 116 or 117, as the case may be, to normal, central position, the corresponding rocking or turning of the equalizer-lever 112 actuating the sylphon to restore the liquid level in alignment-tube 124 to its middle zero position.

During the rolling of the four wheels on the four plates 25, 25, the brakes are applied thereto by the driver of the car and the liquid ascends in the corresponding four gauge-tubes 66 to heights in accordance with, or proportional to, the braking effects exerted on the respective wheels.

Inasmuch as such four brake-indicating tubes 66 are arranged in the same relation to one another as the four plates 25, 25, each plate influencing the liquid in its single corresponding tube only, the driver of the vehicle easily ascertains the braking effects on all four wheels individually and relatively to one another by merely observing the heights of the liquid in the tubes, and, since the tubes are grouped fairly close together, a comparison of the actions of the several brakes is readily had.

A consideration of the operation of one plate and the liquid in its display gauge-tube will suffice for an understanding of all of them.

When the brake is applied to the wheel, the latter pushes the traction-plate along with it with a force proportional to the braking action.

Under these circumstances, bar 39 does not move, since it bears against the pair of stationary shoulders 43, 43, but the engagement of the end of fin 47, which is fixed to the plate 25, carries the bar 42 along with it, causing a stretching and elongation of the springs 41 and an inward travel of the piston 61 in its cylinder 62 which is held stationary, because the bar 45 on which it is mounted is directly connected through the bars 46 to the element 39 held fixed as indicated above.

Such travel of the piston or plunger 61 causes a portion of the oil or other liquid in the cylinder to flow through its relatively-small, valve-controlled, now-open port to the opposite or right-hand side of the piston, and it also forces a portion of the oil out through the metered by-pass 641 (valve 640 being then closed) and pipe 65 up into the corresponding, brake-indicating gauge-tube 66, the incoming liquid readily opening the valve 68 to permit its admission, the sizes of the cylinder-head and piston ports being such as to cause the liquid flowing through them to properly reduce the momentum of the moving parts. Owing to the loose operative mechanical connection between valves 68 and 67, the former may thus open without opening the other.

As soon as the liquid ceases being fed in this manner into the tube, valve 68 closes under the action of gravity, trapping the liquid above it in the tube so that a reading of the liquid height, representing the braking force applied to the wheel, may be readily had.

Such travel of the traction-plate 25 and the companion cross-bar 42 is opposed by the plurality of springs 41 and when the force exerted by such springs equals that imposed on the plate 25 by the braked wheel no further travel of the parts will take place.

The contraction of these springs, if unrestrained, when their elongating action terminates, might, and probably would, have a tendency to return the traction-plate 25 to its original position too rapidly and abruptly.

It is necessary that the plate be restored to initial position rather slowly for the reason that one brake may have been much tighter than the other on the opposite wheel, and, if the plate were permitted to return quickly, it would have a tendency, while the brake-pedal is still depressed, to move the automobile in the reverse direction giving a false or misleading record or indication with relation to the braking capacity of the wheel having the lesser brakeage.

To accomplish this slow return, the following cooperating parts are used.

When the plate 25 is in its normal, unmoved position, as shown in Figure 3, the depending hook ends 491, 492 of the cam element 49 overlap about one-half of the thickness of the edges of the two cross-bars 39 and 42, and, in similar manner, the upstanding hook ends 522 and 523 of cam 52 overlap about the lower half of the thickness of the same two bars.

When the plate 25 is shifted to the left by the action of the braked wheel thereon, the left-hand hook 491 of cam 49, which is rockingly mounted on said traction-plate 25, is swung down more in front of the bar 42, and its right-hand hook 492 is rocked up out of register with the bar 39, by reason of the elevation of the travelling lug 57 on to, and its riding on, the top surface of the stationary block 55.

Thus plate 25 is locked to the movable bar 42, due to the engagement of its fin 47 with one edge thereof and the hook 491 with its opposite edge.

When the movable parts have completed their travel to the left and the traction-plate is free to respond to the action of the strained springs 41, the retarded return movement of the piston 61 in its cylinder 62 acts as a restraining dashpot mechanism, because the piston must necessarily move slowly, which action is controlled by leakage of the liquid through the small circular space between the periphery of the piston and the inner surface of the cylinder, the port through the piston being closed during such travel by its ball check-valve 640.

Obviously, since the traction-plate under consideration is locked to the piston, it can return only as rapidly as the slow travel of the latter will permit.

When the traction-plate again reaches its original position, lug 57 runs off over the end of the stationary block 55 and the cam element 49 is automatically restored to its initial position, as shown in Figure 3.

In this connection, it should be understood, also, that, when the plate 25 starts its journey to the left, its block 48 fixed thereto, by cooperating with lug 521 of the other cam member 52, rockingly mounted on the stationary base, swings said element 52 about its fulcrum, the lug then riding on the under surface of the block, with the result that the left-hand hook 522 of element 52 swings down out of the way to let bar 42 pass over it, and the opposite hook 523 moves up behind the now stationary bar 39, as, otherwise, the plate 25 and both bars 39 and 42 would be locked against movement.

To prevent air from entering cylinder 62 and its piping system, when the piston is moving to the right, or the cylinder is traveling to the left as explained hereinafter, the loose connection between valve 68 and valve 67 is employed, which allows the lower valve 67 to open, while the upper valve 68 remains closed, to permit liquid, if occasion requires, to flow from the central reservoir through the valve 67 into the system and cylinder, thus minimizing or eliminating the chance of air inadvertently obtaining entrance.

If the appliance is traversed by the vehicle in the opposite direction and the brakes applied while the wheels are rolling on the four tractionplates, the operation is practically as follows, the action of one plate only being considered, but, of course, it will be understood that all plates work in substantially the same manner.

As soon as plate 25 moves to the right, bar 42 remains still, bearing against the shoulders 44, and bar 39 travels to the right in grooves 38, stretching or lengthening the restraining springs 41, 41.

In this case, block 48, by cooperation with lug 524 of cam 52 rocks hook 523 down out of the way of bar 39 and swings hook 522 up, and block 55, by coaction with lug 56 of cam 49, swings hook 492 down and hook 491 up, with the result that piston 61 remains stationary while its cylinder 62 moves to the right, due to the pull thereon by traveling bar 39 through side-bars 46, 46 and cross-bar 45.

Such movement of the cylinder, which is permitted by reason of the flexible loop or coil in conduit 65, produces the same results as though the piston had moved and the cylinder remained fixed.

Owing, however, to the fact that bar 39 must necessarily return slowly to its first position, because it is directly connected to the cylinder, the traction-plate is compelled to assume its original position at the same slow speed, even though the springs tend to produce a rapid return, because the plate is locked to the bar by hook 492.

Obviously, as soon as the plate reaches its first position the hooks and cam-lugs will be in their original places.

Returning now to the interrupted consideration of the travel of the automobile over the appliance from right to left, assuming that the brake readings of the liquid levels in the plurality of gauge-tubes has been completed, the car chauffeur releases the brake-pedal and drives the car off of the appliance, and in so doing the rear wheels roll over the intermediate plates during which action the condition of their alignment can be observed in tube 124.

Also, during such traverse of the middle plates by the rear wheels, the diaphragm-pump 98, 99, is operated to effect the ascent of rod 75 and all of the lifter-rods 73, thereby opening all of the valves 68 and 67 and allowing the liquid to pass out of the several tubes into the reservoir, until the normal, zero, liquid level is attained in all of them.

Thereafter the apparatus is again ready for use by passing the automobile over it in either direction.

Figure 14:
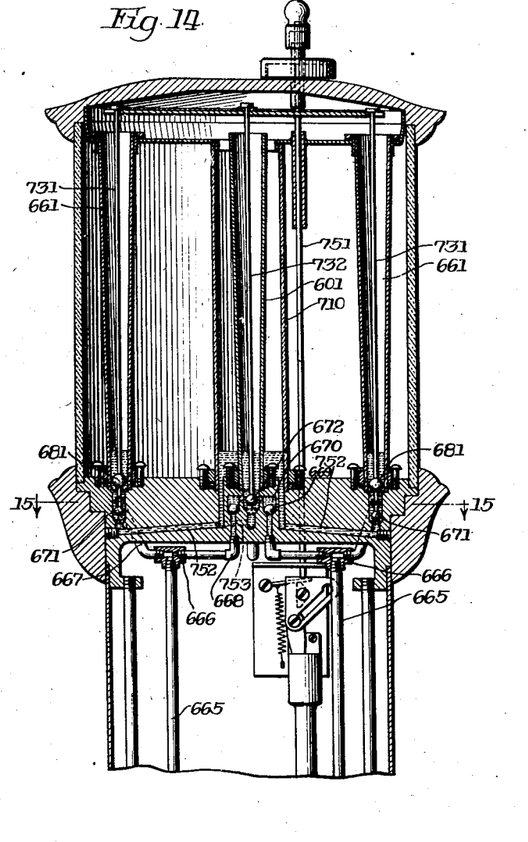
Figure 14 shows the same embodiment in longitudinal, vertical section on line 14—14 of Figure 15.
Figure 15:
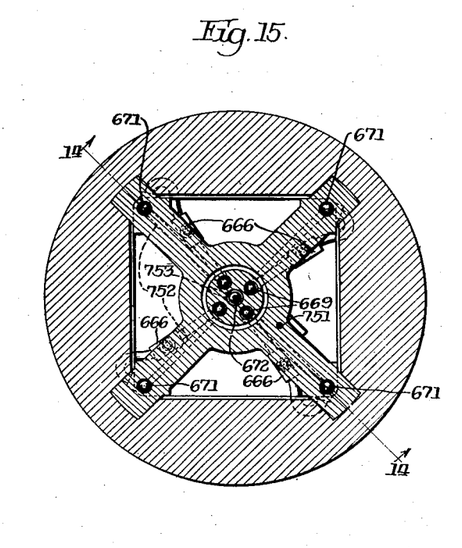
Figure 15 is a horizontal section on line 15—15 of Figure 14.

In some cases, it may be desirable or convenient to indicate or register the total breakage action on all four wheels as well as that of the individual, equal or unequal, brake pressures, and, to this end, a modified structure shown in Figures 13, 14 and 15 has been provided.

In this appliance, in addition to the four properly-located tubes 661, answering to the tubes 66 in the other instance, and each connected to its corresponding traction-plate 25, a common, central, total tube 601 is supplied inside of the reservoir-tube 710.

Each pipe 665, corresponding to the pipe 65 in the other structure, is joined to a connector 666 having a larger outlet connected by a tube 667 to the cavity between the upper and lower ball check-valves 681 and 671 of the individual tube 661, and answering to the valves 68 and 67, such connector having a smaller outlet, one-fifth of the cross-sectional area of its larger outlet, connected by a conduit 668 and its downwardly-closing check-valve 669 to a cavity or chamber 670, common to all of the four individual tubes, and connected to the bottom of the interior of the tube 601.

Thus one-fifth of all the liquid forced to the four tubes 661 is fed into the center, total or aggregate tube 601, which, for convenience, is of the same internal calibre as each of the tubes 661.

In this structure, the slidingly mounted rod 751, similar to the rod 75, and operated in the same way, carries five valve-rods, four characterized 731 for working valves 681, and one denominated 732 for operating a downwardly-closing, companion, ball-valve 672 controlling a port between chamber 670 and a conduit 753 communicating with the bottom portion of the reservoir 701, the latter being connected by passages 752 with all of the ports of valves 671.

When rod 751 is slid up all of the five valves are opened and the liquid drained out of the like number of tubes through conduits 752 and 753 into the reservoir chamber 710 until the liquid levels in all six tubes are the same and at their zero marks.

In the operation of this apparatus the condition of the individual brakes is readily shown in the four tubes 661 and the total brakeage action on all of the four wheels is evidenced by the amount or height of liquid in the aggregate tube 60l.

The single and aggregate brake gauge-tubes may be either straight and of uniform bore or they may be tapered as illustrated with flaring interiors.

The latter type has the advantage that light weight cars with corresponding brake mechanisms can be as accurately tested as those of greater capacity.

In some cases, it may be desirable or permissible not to graduate such tubes, and, in other instances, it may be feasible to so graduate them that, if the liquid levels in any two do not differ from one another more than one graduation, the brakes are sufficiently closely adjusted for ordinary purposes and do not require attention.

The invention as presented in the appended claims is capable of embodiment in many forms of physical structures and those illustrated and described are by way of example only.

We claim:

1. In a vehicle-wheel brake-tester, the combination of a plurality of movable members adapted to be contacted simultaneously each by the corresponding wheel of a vehicle and to be moved thereby due to the application of the brakes to the wheels, means to resist such movements of said members, individual liquid-level indicators actuated by the movements of said members to show separately the extent of movements of said members, and a total liquid-level indicator to show the aggregate movement of all of said members.

2. In a vehicle-wheel brake-tester, the combination of a plurality of movable members adapted to be contacted simultaneously each by the corresponding wheel of a vehicle and to be moved thereby due to the application of the brakes to the wheels, means to resist such movements of said members, a gauge-glass for each of such members, a total gauge-glass, and means actuated by the movements of said members to force liquid into said individual gauge-glasses proportional to the movements of the corresponding members and to feed a portion of such liquid into said total gauge-glass to register the aggregate movement of said members.

3. In a vehicle-wheel brake-tester, the combination of a plurality of movable members adapted to be contacted simultaneously each by the corresponding wheel of a vehicle and to be moved thereby in either of opposite directions due to the application of the brakes to the wheels, means to resist such movements of said members in both directions, a gauge-glass for each of said movable members positioned relatively to one another in the same relation as said movable members to one another, and means actuated by the movements of said members to force liquid into said gauge-glasses proportional to the movements of the corresponding members.

4. In a vehicle-wheel brake-tester, the combination of a plurality of movable members adapted to be contacted simultaneously each by the corresponding wheel of a vehicle and to be moved thereby due to the application of the brakes to the wheels, means to resist such movement of said members, a gauge-glass for each of said movable members positioned relatively to one another in the same relation as said movable members to one another, a total gauge-glass, and means actuated by the movements of said members to force liquid into said individual gauge-glasses proportional to the extent of movements of the corresponding members and to feed a portion of such liquid into said total gauge-glass to register the aggregate movement of said members.

5. In a vehicle-wheel brake-tester, the combination of a plurality of movable members adapted to be contacted simultaneously each by the corresponding wheel of a vehicle and to be moved thereby due to the application of the brakes to the wheels, means to resist such movements of said members, a gauge-glass for each of said movable members, an automatically-closing check-valve for each of said gauge-glasses, means actuated by the movements of said members to force liquid through said valves into said gauge-glasses in amounts proportional to the extent of movements of said wheel-operated members, whereby the volumes of liquid trapped in said glasses by said valves indicate the individual braking actions on said wheels, a liquid reservoir common to and connected by passages to all of said glasses, valves in said passages, and means to open said gauge-glass and passage valve to permit drainage of the liquid from said glasses into said reservoir.

6. In a vehicle-wheel brake-tester, the combination of a plurality of movable members adapted to be contacted simultaneously each by the corresponding wheel of a vehicle and to be moved thereby due to the application of the brakes to the wheels, means to resist such movements of said members, a gauge-glass for each of said movable members, an automatically-closing check-valve for each of said gauge-glasses, means actuated by the movements of said members to force liquid through said valves into said gauge-glasses in amounts proportional to the extent of movements of said wheel-operated members, whereby the volumes of liquid trapped in said glasses by their valves indicate the individual braking actions on said wheels, a liquid reservoir common to and connected by passages to all of said glasses, normally-closed check-valves in said passages, and means operated by the vehicle to open said gauge-glass and passage valves to permit drainage of the liquid from said glasses into said reservoir.

7. In a vehicle-wheel brake-tester, the combination of a plurality of movable members adapted to be contacted simultaneously each by the corresponding wheel of a vehicle and to be moved thereby due to the application of the brakes to the wheels, means to resist such movements of said members, a gauge-glass for each of said movable members, an automatically-closed check-valve for the entrance to each of said gauge-glasses, means actuated by the movements of said members to force liquid through said valves into said gauge-glasses in amounts proportional to the extent of movements of said wheel-operated members, whereby the volumes of liquid trapped in said glasses by their valves indicate the individual braking actions on said wheels, a liquid reservoir common to and connected by passages to all of said glasses, automatically-closing valve means controlling said passages, and means actuated by the vehicle to open said glasses valves and said passage valve means to permit drainage of the liquid from said glasses into said reservoir and to close said valves and valve means preliminary to the next operation of the appliance.

8. In a vehicle-wheel brake-tester, the combination of a plurality of movably-mounted traction-plates over each of which a wheel of a vehicle is adapted to roll in either of opposite directions and to be moved in like direction due to the application of the brake to the wheel, means to resist the travel of said plates in either direction, an indicator for each of said plates to show the degree of its travel and hence the extent of braking action on the corresponding wheel, means operated by the movements of said plates in either direction to actuate said indicators, means to retain said indicators in registering condition, another plate over which a wheel of the vehicle is designed to roll, and means operated by said last-mentioned plate to release all of said indicator retaining means to allow all of said indicators to return to their original positions ready for their next actuations.

9. In a vehicle-wheel brake-tester, the combination of a traction-plate movable in either of opposite directions from a central position by the rolling of a vehicle-wheel thereon in either of such two directions and with the simultaneous application of the brake to the wheel, means to resist such travel of the plate in either direction and to return it to normal central position, a liquid-pump, means to operate said pump by the movement of the plate in either direction, an indicator receiving liquid displaced by said pump showing the extent of travel of the plate in either direction and hence the degree of braking action on the wheel, and means employing said pump as a restraining means to retard the return of said plate to said central position from either direction of displacement therefrom.

10. In a vehicle-wheel testing-appliance, the combination of anti-friction means, a cage for said anti-friction means a traction-plate supported on said anti-friction means and adapted to be moved during the travel of a vehicle-wheel thereon, and means to positively move said cage during movement of said plate.

11. In a vehicle-wheel testing appliance, the combination of a base, anti-friction means rolling on said base, a cage for said anti-friction means, a traction-plate supported on said anti-friction means and adapted to be moved during the travel of a vehicle-wheel thereon, and means to positively move said cage and anti-friction means during the movement of said plate and to the extent of one-half of such plate movement.

12. In a vehicle-wheel testing-appliance, the combination of a traction-plate movable in either of opposite directions during its traverse by a vehicle-wheel, means to resist such movements of the plate, means actuated by said plate to register the extent of such movements of the plate, a single momentum dampening means, and means to render said dampening means active on said plate in both of the directions of travel.

13. In a vehicle-wheel testing-appliance, the combination of a traction-plate movable in either of opposite directions from a central position during its traverse by a vehicle-wheel in the corresponding direction, means to resist said movements of said plate, a cylinder and its piston relatively movable by said plate, an indicator supplied by liquid fed thereto by such relative movements of said cylinder and piston, whereby the volume of said liquid in said indicator registers the extent of travel of the plate, and means to couple said plate to said cylinder and piston to use their relative movement as a restraining means on the plate during its return in either direction to such central position.

14. In a vehicle-wheel brake-tester, the combination of a pair of elongated traction-plates arranged in a straight line, means permitting longitudinal movement of said traction-plates in either direction, independently of one another, means to resist lengthwise travel of said traction-plates in both directions and to restore said plates to normal intermediate positions when permitted to do so, and means actuated by said movements of said plates to indicate individually the extent of movement of said plates when the wheels of a vehicle roll over said plates in either lengthwise direction and their brakes are applied thereto, said indicating means being arranged in the same relative relation as are the plates with which they are associated and readable by, and approximately at the eye level of, the forwardly-facing driver of the vehicle when the latter travels over said plates in either longitudinal direction, each of said indicating means including an upright gauge-glass, means to force a liquid into said gauge-glass proportional in volume to the extent of travel of the corresponding traction-plate, and means to trap such indicating column of liquid in the gauge-glass, all in association with means to drain the trapped liquids from said gauge-glasses preliminary to the next operation of the brake-tester.

15. In a vehicle-wheel brake-tester, the combination of a pair of parallel elongated traction-plates with their lengthwise center lines spaced apart substantially the same distance as the wheel gauge of an automobile, means permitting longitudinal movement of said plates in either direction independently of one another means to resist lengthwise travel of said plates in both directions and to restore said plates to normal intermediate positions when permitted to do so, and individual means actuated by said movements of said plates to indicate the extent of movement of said plates when the wheels of a vehicle roll over them in either lengthwise direction and their brakes are applied thereto, said indicating means being arranged in the same relative relation as are the plates with which they are associated, said indicating means being readable by, and approximately at the eye level of, the forwardly-facing driver of the vehicle when the latter travels over said plates in either longitudinal direction, each of said indicating means including an upright gauge-glass, means to force a liquid into said gauge-glass proportional in volume to the extent of travel of the corresponding traction-plate, and means to trap such indicating column of liquid in the gauge-glass, all in association with means to drain the trapped liquids from said gauge-glasses preliminary to the next operation of the brake-tester.

16. In a vehicle-wheel brake-tester, the combination of two pairs of elongated traction-plates, the two plates of each pair being arranged in a straight line and the two pairs of plates being parallel with their lengthwise center lines spaced apart substantially the same distance as the wheel gauge of an automobile, means permitting longitudinal movement of said plates in either direction independently of one another, means to resist lengthwise travel of said plates in both directions and to restore said plates to normal intermediate positions when permitted to do so, and means actuated by said movements of said plates to indicate individually the extent of movements of said plates when the wheels of a vehicle roll over the plates in either lengthwise direction and their brakes are applied thereto, said four indicating means being arranged in the same relative relation to one another as are the plates with which they are associated and readable by, and approximately at the eye level of, the forwardly-facing driver of the vehicle when the latter travels over said plates in either longitudinal direction, each of said indicating means including an upright gauge-glass, means to force a liquid into said gauge-glass proportional in volume to the extent of travel of the corresponding traction-plate, and means to trap such indicating column of liquid in the gauge-glass, all in association with means to drain the trapped liquids from said gauge-glasses preliminary to the next operation of the brake-tester.

17. In a vehicle-wheel brake-tester, the combination of a plurality of movable members adapted to be contacted simultaneously by the corresponding wheels of a vehicle and to be moved thereby due to the application of the brakes to the wheels, means to resist such movements of said members and to restore said members to normal unoperated positions when permitted to do so, means actuated by the movements of said members to indicate the extent of movements of said members individually, and additional means to indicate the aggregate movement of all of said members, said two indicating means being readable by the forwardly-facing driver of the vehicle while the latter is undergoing test for its brakes.

18. In a vehicle-wheel brake-tester, the combination of a plurality of elongated traction-plates, means permitting longitudinal movement of said plates in either direction, means to resist lengthwise travel of said plates in both directions and to restore said plates to normal unoperated positions when permitted to do so, means actuated by said movements of said plates to indicate individually the extent of movement of said plates when the wheels of a vehicle roll over said plates in either lengthwise direction and their brakes are applied thereto, said indicating means being arranged in the same relative relation as are the plates with which they are associated, and means to indicate the aggregate movement of all of said plates, said two indicating means being readable by the forwardly-facing driver of the vehicle when the latter travels over said plates in either longitudinal direction.

IRA A. WEAVER.
ALBERT R. SQUYER.
EARL K. HALL.